United States Patent [19]

Suarez et al.

[11] Patent Number: 5,677,267
[45] Date of Patent: Oct. 14, 1997

[54] THIXOTROPIC FLUID FOR WELL INSULATION

[75] Inventors: Simon Suarez, Los Teques; Carlos Rios; Ignacio Layrisse, both of Caracas; Jose Gregorio Tovar, Los Teques, all of Venezuela

[73] Assignee: Intevep, S.A., Caracas, Venezuela

[21] Appl. No.: 558,207

[22] Filed: Nov. 16, 1995

Related U.S. Application Data

[63] Continuation of Ser. No. 202,286, Feb. 25, 1994, abandoned.

[51] Int. Cl.$^6$ .................... C09K 7/00; E21B 36/00; E21B 43/24; B01J 13/00
[52] U.S. Cl. .................... 507/203; 507/901; 507/904; 507/925; 507/926; 507/935; 166/272; 166/288; 166/302; 252/62; 252/315.01; 252/315.2
[58] Field of Search .................... 507/203, 901, 507/904, 925, 926, 935; 252/62, 315.01, 315.2; 166/272, 288, 302

[56] References Cited

U.S. PATENT DOCUMENTS

| | | | |
|---|---|---|---|
| 3,642,624 | 2/1972 | Howland et al. | 507/240 |
| 3,831,678 | 8/1974 | Mondshine | 166/288 |
| 4,258,791 | 3/1981 | Brandt et al. | 166/302 |
| 4,296,814 | 10/1981 | Stalder et al. | 166/303 |
| 4,528,104 | 7/1985 | House et al. | 507/233 |
| 4,671,883 | 6/1987 | Connell et al. | 507/107 |
| 4,877,542 | 10/1989 | Lón et al. | 252/62 |

*Primary Examiner*—Joseph D. Anthony
*Attorney, Agent, or Firm*—Bachman & LaPointe, P.C.

[57] ABSTRACT

A thixotropic thermal insulating fluid includes a heavy hydrocarbon, water and oleophilic clay, wherein said heavy hydrocarbon is present in an amount of between about 75% to about 92% by volume of the fluid, said water is present in an amount of between about 5% to about 15% by volume of the fluid, and said oleophilic clay is present in an amount of between about 3% to about 10% by volume of the fluid. The fluid may be prepared by mixing water in an amount of between about 5% to about 15% by total volume of the fluid with oleophilic clay in an amount of between about 3% to about 10% by total volume of the fluid so as to provide a substantially homogeneous first gel product; and mixing said first gel product with a heavy hydrocarbon in an amount of between about 75% to about 92% by total volume of the fluid under agitation for a time sufficient to provide a second thixotropic gel product.

15 Claims, 2 Drawing Sheets

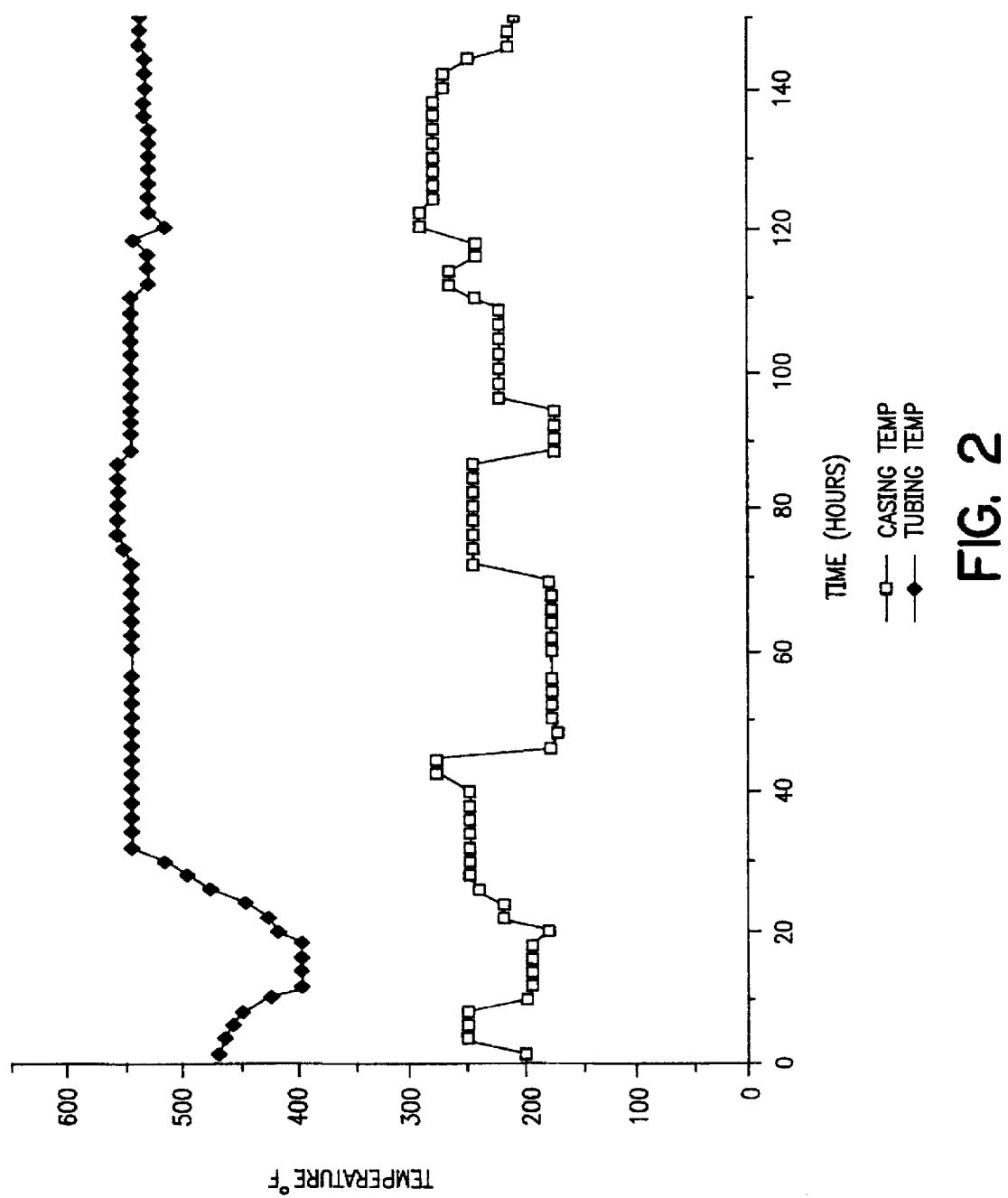

THIXOTROPIC FLUID FOR WELL INSULATION

This is a continuation of application Ser. No. 08/202,286 filed on Feb. 25, 1994 now abandoned.

The invention relates to a fluid for thermally insulating zones of a production well, and to a method for forming the fluid.

Certain operations during the production of oil through wells from subterranean formations make it desirable to thermally insulate one zone from another in the well.

For example, steam injection is a process whereby hot steam is injected through the well into the surrounding formation so as to stimulate production by heating and mobilizing oils which, at normal reservoir conditions, may otherwise not be produced. The added heat from the steam reduces the viscosity of heavy oil and thereby improves the flow of such oil into the well.

Naturally, it is desirable to maintain the steam to be injected at as high a temperature as possible. However, during the time required to inject the steam into the formation, there is a loss of heat out of the production tube through which it is pumped. This loss of heat reduces the efficiency of the process and, in extreme cases, the steam injection may be sufficiently cooled upon reaching the formation that the benefit is negligible.

Further, the heat so lost may cause thermal expansion of various components of the well such as, for example, the casing in which the production tube is set. In this circumstance, expansion of the casing may cause damage to the surrounding cement or may break the bond of the casing to the cement, resulting in possible well collapse, leakage of steam, or buckling or failure of the casing due to thermal stress.

Obviously, it is desirable to provide an effective insulation of the production tube in such a procedure so as to prevent loss of heat and overheating of the casing.

U.S. Pat. No. 3,642,624 to Howland et al. discloses a thermal insulating fluid including oil, a bentonite organic base, asbestos, and soap forming ingredients which form a soap coating on the member to be insulated. When the formulation is contacted by large amounts of water, the soap is dissolved and thermal insulation properties diminish. Further, asbestos is a hazardous and highly contaminant material.

U.S. Pat. No. 4,877,542 to Leon et al. discloses another thermal insulation fluid which includes heavy oil, light oil, clay, calcium oxide and sodium silicate. This fluid performs satisfactorily but contains expensive ingredients. Further, the fluid contains a high content of solids which may precipitate and adversely affect the insulating properties of the fluid.

It is desirable to provide a fluid which addresses the foregoing problems while efficiently insulating the production tube.

It is therefore the primary object of the invention to provide a thixotropic thermal insulating fluid that is effective, inexpensive and safe to use.

It is a further object of the invention to provide a method for making a thermal insulating fluid according to the invention.

It is a still further object of the invention to provide a fluid which is made from ingredients readily available on site.

Other objects and advantages will appear hereinbelow.

SUMMARY OF THE INVENTION

The foregoing objects and advantages are readily attained by the present invention.

In accordance therewith, a thixotropic thermal insulation fluid is provided which comprises a heavy hydrocarbon, water and oleophilic clay, wherein said heavy hydrocarbon is present in an amount of between about 75% to about 92% by volume of the fluid, said water is present in an amount of between about 5% to about 15% by volume of the fluid, and said oleophilic clay is present in an amount of between about 3% to about 10% by volume of the fluid.

The fluid according to the invention is prepared in accordance therewith by mixing water in an amount of between about 5% to about 15% by total volume of the fluid with oleophilic clay in an amount of between about 3% to about 10% by total volume of the fluid so as to provide a substantially homogeneous mixture; and mixing said mixture with a heavy hydrocarbon in an amount of between about 75% to about 92% by total volume of the fluid under agitation for a time sufficient to provide a thixotropic gel.

BRIEF DESCRIPTION OF THE DRAWINGS

A detailed description of preferred embodiments of the invention follows, with reference to the attached drawings, wherein:

FIG. 2 illustrates the temperature profile of production tube compared to casing during use of an insulating fluid according to the invention.

DETAILED DESCRIPTION

Figure 1:
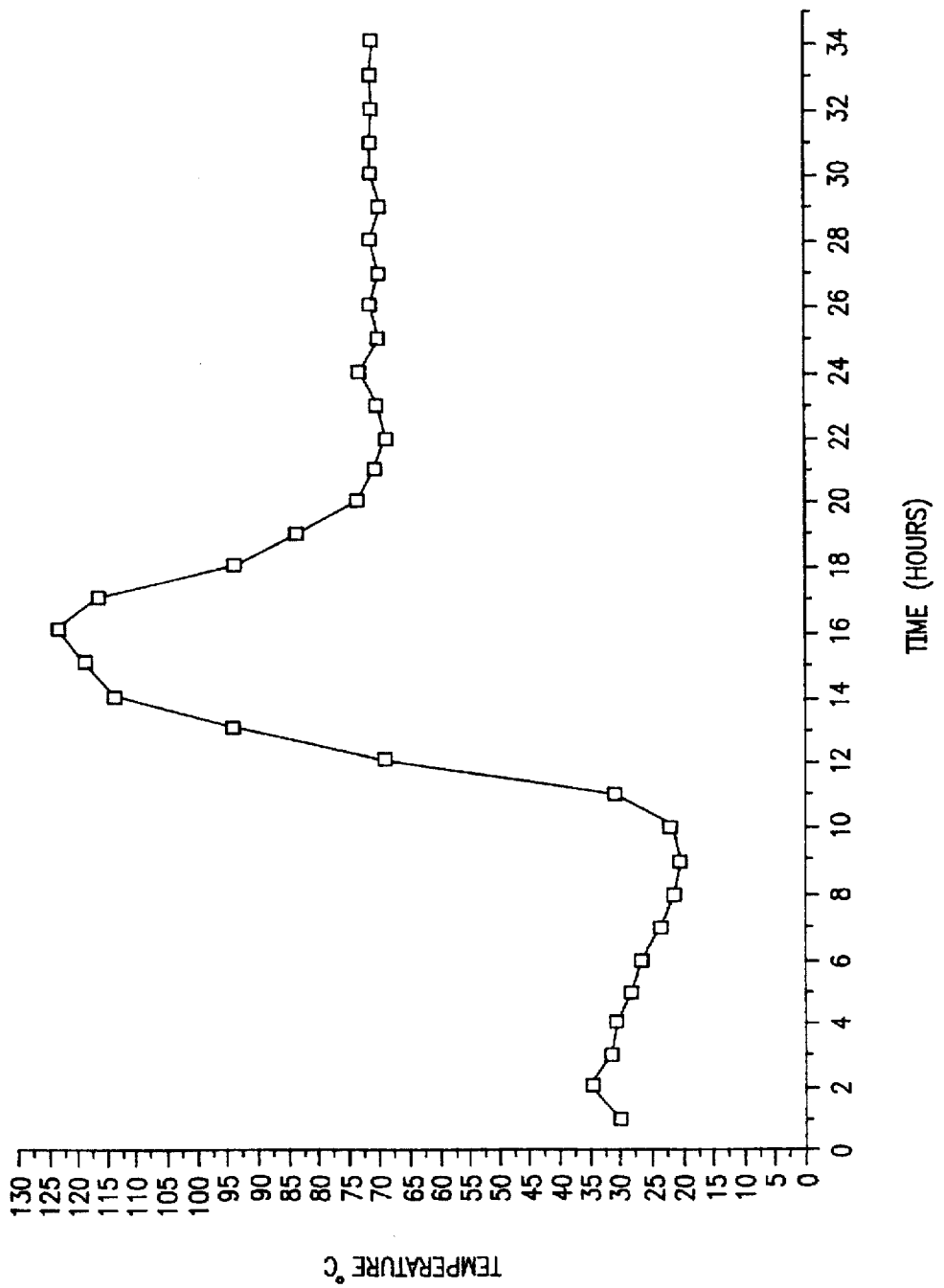
FIG. 1 illustrates the thermal insulation properties of a fluid according to the invention.

The invention relates to a thixotropic thermally insulating fluid for use in insulating the production tube of a production well during steam treatment and/or other operations involving high temperature products in the production tube. The fluid sets or gels around the production tube and insulates same so as to reduce heat loss into the annular space and the casing or other well equipment and thereby to reduce or prevent problems associated with such heat loss including reduction in operation efficiency and potential damage to casing, cement and other completion equipment. The thixotropic nature of the fluid is beneficial in that the fluid is readily flowable when it is desired to remove or otherwise transport the fluid.

In accordance with the invention, the fluid comprises a gel of heavy hydrocarbon, water and clay in the following preferable proportions:

|  | % vol |
| --- | --- |
| hydrocarbon | 75–92 |
| water | 5–15 |
| clay | 3–10 |

In accordance with the invention, the hydrocarbon is a heavy or extra heavy hydrocarbon which preferably has an API gravity of less than or equal to about 15, preferably between about 10 to about 15 and most preferably about 14.5. Heavy hydrocarbon having an API gravity less than about 10 is not preferred due to potential problems in pumping wherein the hydrocarbon may require heating before it will flow. On the other hand, hydrocarbon having an API gravity higher than about 15 is generally not necessary to obtain a suitable fluid in accordance with the invention.

The hydrocarbon also preferably has a water content of less than or equal to about 1% by volume of the hydrocarbon, and is preferably stable up to temperatures of at least about 650° F. so that the oil does not react or crack when subjected to steam injection temperatures.

The heavy hydrocarbon forms the substantial portion of the fluid medium of the insulation fluid and, as can be readily appreciated, is typically available in sufficient quantities on site at production wells.

The clay, in accordance with the invention, is an organophilic, preferably oleophilic clay. The affinity of the clay for the hydrocarbon medium is instrumental in providing the desired thixotropic gel formation and provides the fluid with desirable rheologic properties. Numerous types of clay, particularly oleophilic clay, are suitable in accordance with the invention including, for example, bentonite, sepiolite, attapulgite, hectorite and mixtures thereof and the like.

Oleophilic bentonite is preferred because it is readily available on site and therefore contributes to an inexpensive product.

The water is added as a polar component which activates the clay and thereby induces gel formation. Thus, water is also an instrumental element of the fluid according to the invention. Furthermore, the components of the fluid set forth above provide an excellent thixotropic insulating fluid without the use of costly ingredients such as those used in U.S. Patent No. 4,877,542.

The fluid of the invention may be prepared, in accordance with the invention, by first mixing the water and clay to provide a substantially homogeneous gel product, and subsequently mixing the gel product with the heavy hydrocarbon under sufficient agitation and for a sufficient period of time, preferably at least about 3 hours, so as to provide the desired thixotropic gel product.

The foregoing mixing sequence provides the progressive formation of a first gel of activated clay and water which, upon mixing with the heavy hydrocarbon, results in the formation of the desired thixotropic fluid. The initial mixing of the clay and water polarizes and activates the clay so as to provide a clay gel which readily gels with the heavy hydrocarbon in order to provide the desired thixotropic insulating fluid in accordance with the invention. The mixing time further helps to provide the fluid with good thermal properties.

The fluid so formed may then be used, in accordance with the invention, to thermally insulate portions or zones of a production well as needed. The thixotropic nature of the fluid makes it readily and easily pumpable for deployment in the well, as the agitation of the pumping equipment liquifies the gel. Once the fluid has reached the appropriate position, pumping is stopped and the fluid returns to gel form as desired. In this condition, the fluid serves as an excellent thermal insulator, thereby reducing heat loss from the injected steam and shielding the casing and other completion equipment from overheating.

It is noted that some components of the fluid, particularly the heavy hydrocarbon component, may exhibit an expansion upon increase in temperature. Thus, in accordance with the invention, the total volume of fluid to be prepared should be corrected to the appropriate temperature. In this way, overpressuring of the annular space due to expansion of the fluid can be avoided. In addition, the pressure in the annular space can be monitored during the steam treatment so that excess pressure can be bled off if necessary.

It should be noted that while this disclosure is made in terms of insulating a production tube within a casing by pumping the fluid into the annular space defined therebetween, the fluid could of course be used in numerous other insulation applications as desired. Further, the related operation need not be steam injection. For example, the fluid may suitably be used during the production of a crude having high paraffin wax content. The insulation fluid in this case would help reduce heat loss from the crude and would thereby reduce formation of paraffin wax deposits in the production tube which might normally form during cooling of the crude.

It should also be noted that the fluid of the invention is most effective as an insulating barrier so long as it is in contact with either or both of the production tube or the casing.

The annular space or other zone to which the fluid is to be deployed is preferably flushed or otherwise washed before pumping the fluid so as to remove any residual completion material or other contaminant which may adversely impact upon the thixotropic and/or insulating properties of the fluid.

The following examples demonstrate the effectiveness of the fluid.

EXAMPLE 1

A thermal insulating fluid was prepared as follows: oleophilic bentonite (11.4 g/l) was combined with water (10% v/v) and mixed to obtain a homogeneous mixture. The mixture was then mixed with crude oil (14° API, 90% v/v) with sufficient agitation until a gel of uniform consistency was obtained and placed in the annulus between an inner tube and an outer tube of a high pressure test vessel. Temperature measurements were taken with thermocouples located along the external wall of the inner tube and also along the internal wall of the outer tube. Provisions were taken to measure and control pressure surges during the evaluation of the thermal insulating fluid. Several samples were tested for precipitation of solid materials before and after each test. The thermal behavior tests were carried out by maintaining the inner tube of the vessel at a temperature of about 300° C. (572° F.) for about 34 hours. During the test, the pressure of the annulus was maintained at 1200 psi. Temperatures of the inner and outer tubes were recorded every 15 minutes in order to follow the temperature profile across the fluid contained in the annular space between the tube walls. FIG. 1 shows the temperature of the outer tube over the 34 hour period. The temperature profile stabilization occurred after 22 hours.

EXAMPLE 2

The insulating properties of the composition described in Example 1 (Sample 1) were compared with a commercially available liquid insulation (KEN-PAK™ by IMCO). KEN-PAK™ (Sample 2) is a commercial gelatinous oil casing composition which has thixotropic properties. This composition contains a low gravity asphalt base crude oil with an API gravity between about 10 and about 25, a specially modified, partially saponified fatty acid chemical, and quicklime.

Both compositions were subjected to similar conditions of heat transfer inside a test pressure vessel (quantitative cell). The vessel was provided with 23 thermocouples located on the external wall of the inner tube and the internal wall of the outer tube. Provisions were taken to measure and control pressure increases during the evaluation of the thermal insulating fluid. The vessel was furnished with a water coil, placed externally to minimize axial heat losses. The system of temperature measurements was connected to a computer data system to calculate thermal conductivity. The test was carried out for a time of 72 hours, when steady state conditions were reached. After each test, the annular space was inspected for solid sediment. None was noted.

Results of this test are shown in Table 1. For the composition described in Example 1 the difference of temperature between inner and outer tube was 70° C. (158° F.), with an equivalent thermal conductivity of 0.100 Btu/hr.°F.ft. These results confirm that the composition has a good thermal insulating behavior in comparison with the commercial product KEN-PAK™. Likewise, the thixotropy of the insulating composition allowed placement and removal from the annular space. The present composition showed good thermal stability after exposure to 300±° C. for 72 hours.

TABLE 1

| INSULATING MIXTURE | INNER TUBE TEMPERA- TURE °C. | DIFFERENCE OF TEMPERA- TURE °C. | EQUIVALENT THERMAL CONDUCTIVITY Btu/hr · °F. · ft |
|---|---|---|---|
| SAMPLE 1 | 115 | 70 | 0.100 |
| SAMPLE 2 | 115 | 79.5 | 0.089 |

EXAMPLE 3

A composition was prepared in accordance with the teachings of U.S. Pat. No. 4,877,542, and tested and compared to the composition of the present invention.

The composition according to the invention (Sample 1) was prepared as described in Example 1 above.

The composition according to the '542 patent (Sample 3) contained heavy oil, light oil, clay, calcium oxide and sodium silicate.

Samples 1 and 3 were subjected to similar heat transfer conditions in a test pressure vessel (quantitative cell) as described in Example 2 above. Results of this test are shown in Table 2.

TABLE 2

| INSULATING MIXTURE | INNER TUBE TEMPERA- TURE °C. | DIFFERENCE OF TEMPERA- TURE °C. | EQUIVALENT THERMAL CONDUCTIVITY Btu/hr · °F. · ft |
|---|---|---|---|
| SAMPLE 1 | 115 | 70 | 0.100 |
| SAMPLE 3 | 115 | 57.1 | 0.170 |

As illustrated in Table 2, the fluid of the present invention (Sample 1) exhibited improved thermal insulation properties (larger temperature difference) as compared to Sample 3. Further, Sample 1 was prepared, in accordance with the invention, without the use of light oil, calcium oxide or sodium silicate, all of which add to the cost of fluids such as Sample 3.

EXAMPLE 4

A field test of the thermal insulating fluid embodying the present invention was carried out in a well (JOC-536) in the Morichal field in Venezuela. The thermal insulating fluid was prepared by combining oleophilic bentonite (400 pounds), water (10 barrels) and heavy crude (13.5 API, 87 barrels). The fluid was placed in the annulus of the well.

Steam (5500 tons) was injected into the well at the rate of 250 tons/day. For a period of 22 days the pressure within the annular space of the well was periodically released during the initial days of steam injection so as to reduce the pressure within the annulus to below about 1,000 psi. The highest annulus pressure recorded during the test was 1,500 psi.

The thermal insulating fluid was prepared by first mixing the water and oleophilic bentonite until a homogeneous mixture was obtained. Then this mixture was mixed with the heavy crude, agitating until a gel was obtained. Two mixing tanks were used to prepare the mixture. During the preparation, rheologic measurements were taken to assure a thixotropic gel formation. An optimal time of mixing of 3 hours was determined.

FIG. 2 shows temperature profiles of tubing and casing during the steam injection. Differences in such temperatures confirm the thermal insulating behavior of the fluid.

During recovery of the thermal insulating fluid from the annulus of the well, the fluid began to flow as soon as pressure was applied to it. The total amount of recovered thermal insulating fluid was about 97 percent of the initial volume placed in the annulus.

The field test was deemed to be successful, and also indicated that a substantial cost saving was obtained in comparison to insulation of an equivalent well using a commercially available insulating fluid.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A thixotropic thermal insulating fluid prepared in accordance with the following steps:
   (a) mixing water in an amount of between about 5% to about 15% by total volume of the fluid with oleophilic clay in an amount of between about 3% to about 10% by total volume of the fluid so as to provide a substantially homogeneous first gel product of activated clay and water; and
   (b) subsequently mixing said homogeneous first gel product with a heavy hydrocarbon having an API gravity of less than or equal to about 15 in an amount of between about 75% to about 92% by total volume of the fluid under agitation for a time sufficient to provide a desired second thixotropic gel product having good thermal properties;
   said thixotropic thermal insulated fluid comprising a heavy hydrocarbon having an API gravity of less than or equal to about 15, water and oleophilic clay, wherein said heavy hydrocarbon is present in an amount of between about 75% to about 92% by volume of the fluid, said water is present in an amount of between about 5% to about 15% by volume of the fluid, and said oleophilic clay is present in an amount of between about 3% to about 10% by volume of the fluid.

2. A fluid according to claim 1, wherein said heavy hydrocarbon has an API gravity of between about 10 to about 15.

3. A fluid according to claim 1, wherein said heavy hydrocarbon has an API gravity of about 14.5.

4. A fluid according to claim 1, wherein said heavy hydrocarbon remains stable at temperatures of at least about 650° F.

5. A fluid according to claim 1, wherein said heavy hydrocarbon has a water content of less than about 1% with respect to volume of said heavy hydrocarbon.

6. A fluid according to claim 1, wherein said oleophilic clay is selected from the group consisting of bentonite, sepiolite, attapulgite, hectorite, and mixtures thereof.

7. A fluid according to claim 1, wherein said oleophilic clay is oleophilic bentonite.

8. A method for forming a thixotropic thermal insulating fluid, comprising the steps of:

mixing water in an amount of between about 5% to about 15% by total volume of the fluid with oleophilic clay in an amount of between about 3% to about 10% by total volume of the fluid so as to provide a substantially homogeneous first gel product of activated clay and water; and subsequently mixing said homogeneous first gel product with a heavy hydrocarbon having an API gravity of less than or equal to about 15 in an amount of between about 75% to about 92% by total volume of the fluid under agitation for a time sufficient to provide a desired second thixotropic gel product having good thermal properties.

9. A method according to claim 8, wherein said heavy hydrocarbon has an API gravity of between about 10 to about 15.

10. A method according to claim 8, wherein said heavy hydrocarbon has an API gravity of about 14.5.

11. A method according to claim 8, wherein said heavy hydrocarbon remains stable at temperatures of at least about 650° F.

12. A method according to claim 8, wherein said heavy hydrocarbon has a water content of less than about 1% with respect to volume of said heavy hydrocarbon.

13. A method according to claim 8, wherein said oleophilic clay is selected from the group consisting of bentonite, sepiolite, attapulgite, hectorite, and mixtures thereof.

14. A method according to claim 8, wherein said oleophilic clay is oleophilic bentonite.

15. A method according to claim 8, wherein said step of mixing said mixture of water and clay with said heavy hydrocarbon includes mixing for a period of at least about 3 hours.

* * * * *